D. D. ROBERTS.
POWER TRANSMISSION ATTACHMENT FOR AUTOMOBILES.
APPLICATION FILED MAY 22, 1920.
1,353,786.
Patented Sept. 21, 1920.
2 SHEETS—SHEET 1.
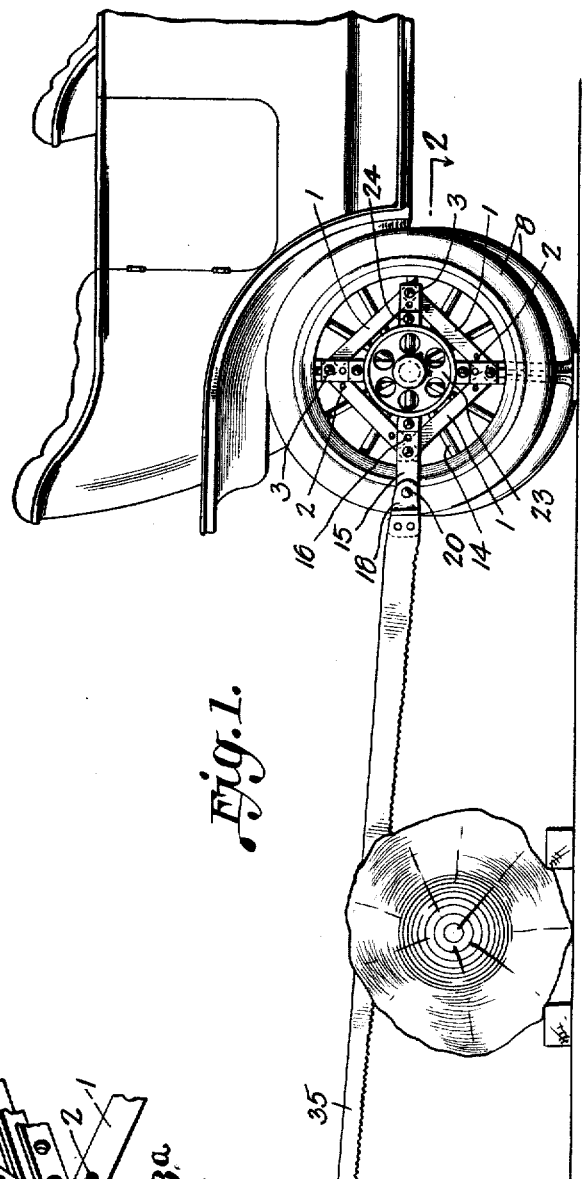
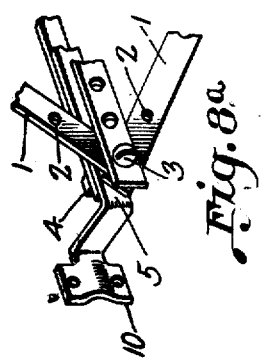
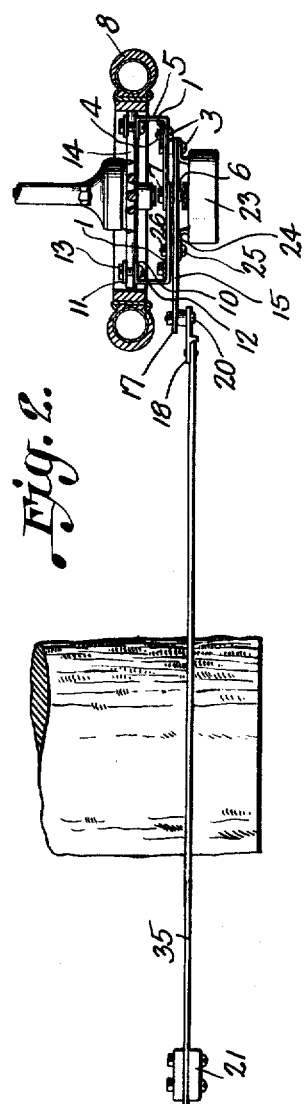

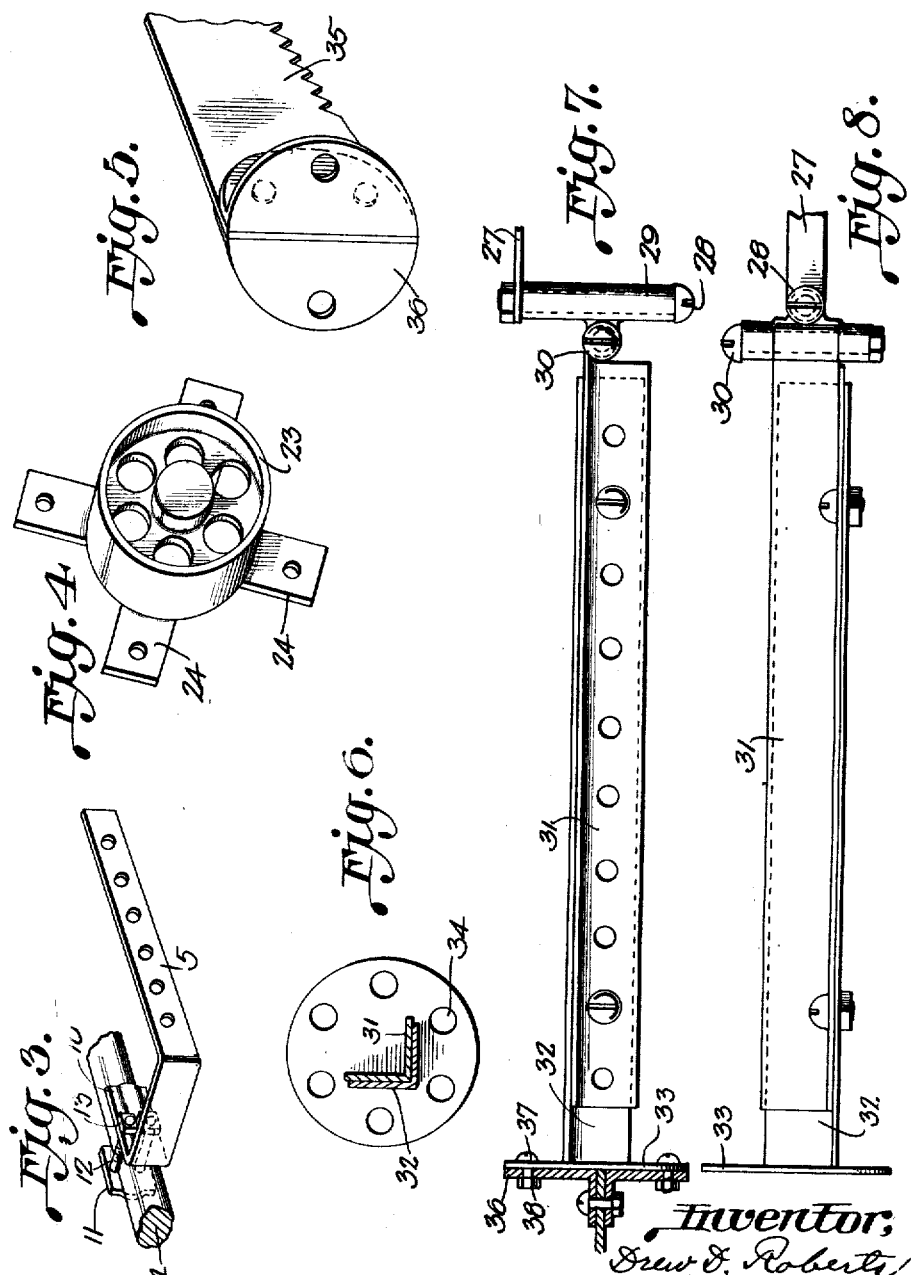

UNITED STATES PATENT OFFICE.

DREW D. ROBERTS, OF PERRY, FLORIDA.

POWER-TRANSMISSION ATTACHMENT FOR AUTOMOBILES.

1,353,786.  Specification of Letters Patent.  Patented Sept. 21, 1920.

Application filed May 22, 1920. Serial No. 383,528.

*To all whom it may concern:*

Be it known that I, DREW D. ROBERTS, a citizen of the United States, residing at Perry, in the county of Taylor and State of Florida, have invented certain new and useful Improvements in Power-Transmission Attachments for Automobiles, of which the following is a specification.

This invention relates to automobile wheel attachments, and pertains especially to a power transmission device attachable to and operated by an automobile wheel for operating various machinery, and particularly drag saws.

The object of the invention is to provide a device of such novel and peculiar construction and arrangement of parts as to be adjustably attached to the spokes of an automobile wheel, and to be expeditiously secured to and removed from the wheel.

A further object of the invention is to provide an automobile wheel attachment offset from the wheel and adjustable radially thereon according to the size of the wheel or the length of the wheel spokes, and having a detachable pulley central thereof and of the wheel, and having means for attaching a drag saw.

Various other objects, advantages and improved results are attainable in the manufacture and practical application of the invention, as will be hereinafter fully described.

In the accompanying drawings forming part of this application:—

Figure 1 is a side elevation of part of an automobile showing the application of the invention.

Fig. 2 is a cross section of the attachment taken on the dotted line A—A Fig. 1.

Fig. 3 is a detail perspective view of one of the spoke attaching members.

Fig. 4 is a detail perspective view of the detachable pulley.

Fig. 5 is an elevation showing a modified saw connection.

Fig. 6 is a similar view showing another modification of saw connection.

Figs. 7 and 8 are detail elevations of the saw extension frame.

Fig. 8ª. is a detail perspective view of part of the wheel frame.

The same reference characters denote the same parts throughout the several views of the drawings.

Instead of attaching a pulley to an automobile axle, or to the hub of an automobile wheel for operating saws and various other devices by the driving power of automobiles through the medium of a belt, and instead of transmitting the power of automobiles by gear and pinion, or by chain and sprockets, I provide a skeleton frame connected with and offset from the spokes of an automobile wheel, and a pulley detachably secured to and central of the frame and central of the wheel axle.

The wheel frame comprises four members 1, having holes 2 for suitable bolts 3, by means of which the members 1 are relatively adjustable according to the size of a wheel to which the frame is to be attached. Said bolts 3 have suitable nuts 4, and secure brace arms 5 to the corners or meeting ends of the members 1. Said arms 5 preferably overlap in pairs and cross central of the frame, where they are secured by a bolt 6 and nut 7 central of the hub of the wheel 8 of the rear axle of an automobile. The outer end of each arm has a leg terminating in a spoke-clamping member 10, secured to a companion clamp member 11 by suitable bolts 12 and nuts 13 for clamping the frame to the wheel spokes 14. Obviously the arms 5 may be contracted and expanded relative to each other without expanding and contracting the frame members 1, but it will be seen that the arms and the frame members may all be adjusted together according to the size of the wheel to which the device is to be applied.

In order to connect a saw with the frame a plate 15 having holes 16 is secured to the frame by means of the bolts 3 and 6, and said plate has an extension 17 projecting from one corner of the frame. The connection between the saw and the frame projection is such as to permit the saw to be given horizontal reciprocating movement by the revolution of the wheel and the frame, and such connection may be made by an eccentric 18 having the saw 19 attached, and revolubly attached to said extension 17 by a pin 20, the free end of the saw being weighted as by a weight 21. The saw may be placed at various distances from the wheel frame by means of lengthening bars 22.

In order that the wheel frame may be used for belt driving I provide a pulley 23, having ears 24 which are secured to the cross members or arms of the frame by bolts 25 and nuts 26. Obviously the pulley may be removed and replaced as desired for operating various devices and machinery.

Referring to Figs. 6, 7 and 8 of the drawings, the frame extension 27 has a lateral pin 28 upon which is mounted a sleeve or collar 29, having a coupling pin 30 perpendicular to the collar, and the inner end of one of the extension bars 31 is swiveled on the pin 30 so as to swing laterally. The outer end of the other or companion bar 32 has a disk 33 provided with holes 34, and the saw 35 has flanges 36 adjustably secured to the disk by bolts 37 and nuts 38, whereby the saw may be placed at various sawing angles, as for example, for sawing trees.

Obviously an ordinary pitman may be attached to the frame, and other variations and modifications may be made for utilizing the wheel-revolved frame, and I, therefore, do not wish to be understood as confining myself to any particular material, size and application of the invention, nor to any particular number of parts thereof, but reserve the right to make such changes and variations in the manufacture and practical application of the invention as may come within the scope of the appended claims.

Having thus described my invention what I claim as new and desire to secure by Letters Patent is:—

1. In a power transmission attachment for automobiles, a skeleton frame comprising relatively adjustable members, brace arms spanning the frame and adjustable thereon, legs extending from the arms and terminating in a clamping member, and a clamping member coöperating with the other clamping member for securing the frame to the spokes of an automobile wheel.

2. In a power transmission attachment for automobiles, a frame comprising a plurality of members adjustably secured together so as to increase and diminish the size of the frame, braces extending across the frame and adjustable thereon, one end of each of said braces forming a leg for offsetting the frame from a wheel of an automobile, and means for clamping said legs to the spokes of the wheel.

3. In a power transmission attachment for automobiles, a skeleton frame, braces adjustably secured to and crossing central of the frame, leg extensions of the braces attachable to the spokes of an automobile wheel and offsetting the frame from the wheel, and a plate secured to the braces and projecting from the frame and adapted to have a drag saw connected therewith.

In witness whereof I hereunto set my hand in the presence of two witnesses.

DREW D. ROBERTS.

Witnesses:
W. T. HENDRY,
C. P. DIAMOND.